United States Patent
Qi

(10) Patent No.: US 12,026,371 B2
(45) Date of Patent: Jul. 2, 2024

(54) METHOD, SYSTEM, AND DEVICE FOR WRITING COMPRESSED DATA TO DISK, AND READABLE STORAGE MEDIUM

(71) Applicant: INSPUR SUZHOU INTELLIGENT TECHNOLOGY CO., LTD., Jiangsu (CN)

(72) Inventor: Guoqiang Qi, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 53 days.

(21) Appl. No.: 17/907,796

(22) PCT Filed: Nov. 4, 2020

(86) PCT No.: PCT/CN2020/126353
§ 371 (c)(1),
(2) Date: Aug. 29, 2022

(87) PCT Pub. No.: WO2021/169388
PCT Pub. Date: Sep. 2, 2021

(65) Prior Publication Data
US 2023/0221865 A1  Jul. 13, 2023

(30) Foreign Application Priority Data
Feb. 28, 2020  (CN) .......................... 202010131190.6

(51) Int. Cl.
G06F 3/06  (2006.01)
(52) U.S. Cl.
CPC .......... *G06F 3/0608* (2013.01); *G06F 3/0659* (2013.01); *G06F 3/0674* (2013.01)

(58) Field of Classification Search
None
See application file for complete search history.

(56) References Cited

U.S. PATENT DOCUMENTS 6,523,102 B1 *  2/2003  Dye ........................ G06F 12/08
                                                            711/170
8,566,286 B1 * 10/2013  Hawton ............. G06F 11/1458
                                                            707/654
(Continued)

FOREIGN PATENT DOCUMENTS

CN   103744627 A    4/2014
CN   103984528 A    8/2014
(Continued)

OTHER PUBLICATIONS

International Search Report of corresponding PCT application PCT/CN2020/126353, mailed Feb. 7, 2021, 6 pages.
(Continued)

*Primary Examiner* — Edward J Dudek, Jr.
*Assistant Examiner* — Ralph A Verderamo, III
(74) *Attorney, Agent, or Firm* — Cooper Legal Group LLC

(57) ABSTRACT

A method, system, and device for writing compressed data to a disk, and a readable storage medium. The method includes: acquiring compressed data, and determining a length of the compressed data; storing the compressed data in a linked list, and adding the length of the compressed data to a linked list length, wherein the linked list length is a total length of all compressed data in the linked list; determining whether the linked list length exceeds a threshold value; and if YES, allocating an idle thread to merge all the compressed data in the linked list, and carrying out a write-to-disk operation on the merged compressed data.

14 Claims, 2 Drawing Sheets

(56) References Cited

U.S. PATENT DOCUMENTS

| | | |
|---|---|---|
| 10,216,654 B1 | 2/2019 | Zhao et al. |
| 2012/0203955 A1 | 8/2012 | Kim et al. |
| 2015/0058556 A1* | 2/2015 | Hamedani ............. G06F 3/0665 |
| | | 711/114 |
| 2019/0050417 A1 | 2/2019 | Ellis et al. |
| 2019/0129848 A1* | 5/2019 | Hu .......................... G06F 9/526 |
| 2021/0216242 A1* | 7/2021 | Lee ....................... G06F 3/0659 |

FOREIGN PATENT DOCUMENTS

| | | | |
|---|---|---|---|
| CN | 105515842 | A | 4/2016 |
| CN | 106569750 | A | 4/2017 |
| CN | 108363719 | A | 8/2018 |
| CN | 109062502 | A | 12/2018 |
| CN | 109460193 | A | 3/2019 |
| CN | 109634528 | A | 4/2019 |
| CN | 110727685 | A | 1/2020 |
| CN | 110767265 | A | 2/2020 |
| CN | 111309269 | A | 6/2020 |

OTHER PUBLICATIONS

Written Opinion of International Searching Authority of corresponding PCT application PCT/CN2020/126353, mailed Feb. 7, 2021, 9 pages.
First Office Action of corresponding CN priority application CN202010131190.6, mailed Feb. 3, 2021, 10 pages.
2nd Office Action of corresponding CN priority application CN202010131190.6, mailed Jul. 15, 2021, 10 pages.

* cited by examiner

METHOD, SYSTEM, AND DEVICE FOR WRITING COMPRESSED DATA TO DISK, AND READABLE STORAGE MEDIUM

This application claims priority to Chinese Patent Application No. 202010131190.6, filed on Feb. 28, 2020, in China National Intellectual Property Administration and entitled "Method, System, and Device for Writing Compressed Data to Disk, and Readable Storage Medium", the contents of which are hereby incorporated by reference in its entirety.

FIELD

The present application relates to the field of writing compressed data to disks, and particularly to a method, system, and device for writing compressed data to a disk, and a readable storage medium.

BACKGROUND

Data compression refers to a technical approach of reducing a data size without losing any useful information to save storage space and improve transmission, storage and processing efficiency, or reorganizing data according to a certain algorithm to reduce data redundancy and save storage space. With the development of data compression technologies, data sizes in storage systems are reduced greatly, thereby saving storage space and improving system transmission, storage and processing efficiency.

However, with the increasing expansion of data services, requirements for high load and low latency of storage devices have increased. Therefore, a storage device is required to be fast enough in read and write. In an existing data compression process, compressed data needs to be merged before a write-to-disk operation. This process involves copying of byte-level data in a memory, while the operation of merging the compressed data is embedded to an Input/Output (IO) path. As a result, the IO performance is affected.

Therefore, how to reduce influence of writing compressed data to a disk on IO performance is a technical problem that needs to be solved by those skilled in the art currently.

SUMMARY

An objective of the present application is to provide a method, system, and device for writing compressed data to a disk, and a readable storage medium, to reduce influence of writing compressed data to a disk on IO performance.

In order to solve the foregoing technical problem, the present application provides a method for writing compressed data to a disk, including:
acquiring compressed data and determining a length of the compressed data;
storing the compressed data in a linked list, and adding the length of the compressed data to a linked list length, the linked list length is a total length of all compressed data in the linked list;
determining whether the linked list length exceeds a threshold value; and
in response to the linked list length exceeding the threshold value, allocating an idle thread to merge all the compressed data in the linked list, and carrying out a write-to-disk operation on the merged compressed data.

In an embodiment, after the step of allocating the idle thread to merge all the compressed data in the linked list, and carrying out the write-to-disk operation on the merged compressed data, the method further includes:
deleting all the compressed data from the linked list, and setting the linked list length to zero.

In another embodiment, in response to the linked list length not exceeding the threshold value, the method further includes:
performing the step of acquiring the compressed data and determining the length of the compressed data.

In a further embodiment, after the step of allocating the idle thread to merge all the compressed data in the linked list, and carrying out the write-to-disk operation on the merged compressed data, the method further includes:
outputting prompting information that the write-to-disk operation for the compressed data is completed.

The present application also provides a system for writing compressed data to a disk, including:
an acquisition module, configured to acquire compressed data and determine a length of the compressed data;
a data storage module, configured to store the compressed data in a linked list and add the length of the compressed data to a linked list length, the linked list length is a total length of all compressed data in the linked list;
a determination module, configured to determine whether the linked list length exceeds a threshold value; and
a write-to-disk module, configured to, when the linked list length exceeds the threshold value, allocate an idle thread to merge all the compressed data in the linked list, and carry out a write-to-disk operation on the merged compressed data.

In an embodiment, the system further includes:
a deletion module, configured to, after the idle thread is allocated to merge all the compressed data in the linked list and the write-to-disk operation is carried out on the merged compressed data, delete all the compressed data from the linked list, and set the linked list length to zero.

In another embodiment, the system further includes:
a returning module, configured to, when the linked list length does not exceed the threshold value, trigger the acquisition module to perform the step of acquiring compressed data and determining a length of the compressed data.

In a further embodiment, the system further includes:
an output module, configured to, after the idle thread is allocated to merge all the compressed data in the linked list and the write-to-disk operation is carried out on the merged compressed data, output prompting information that the write-to-disk operation for the compressed data is completed.

The present application also provides a device for writing compressed data to a disk, including:
a memory, configured to store a computer program; and
a processor, configured to execute the computer program to implement any steps of the method for writing compressed data to a disk as described above.

The present application also provides a readable storage medium, storing a computer program executed by a processor to implement any steps of the method for writing compressed data to a disk as described above.

The present application provides a method for writing compressed data to a disk, including: acquiring compressed data, and determining a length of the compressed data; storing the compressed data in a linked list, and adding the length of the compressed data to a linked list length, the linked list length is a total length of all compressed data in the linked list; determining whether the linked list length exceeds a threshold value; and if YES, allocating an idle thread to merge all the compressed data in the linked list, and carrying out a write-to-disk operation on the merged compressed data.

According to the technical solution provided in the present application, the compressed data is stored in the linked list, the length of the compressed data is added to the linked list length, and when the linked list length exceeds the threshold value, the idle thread is allocated to merge all the compressed data in the linked list. A merging process of the compressed data is decoupled from an IO path, the compressed data does not need to be merged during an IO process of compression and write-to-disk, and instead, an idle thread is specially allocated to merge the compressed data. In this manner, influence on IO performance is avoided, Central Processing Unit (CPU) resources are fully utilized, and storage performance is improved. In addition, the present application also provides a system and device for writing compressed data to a disk, and a readable storage medium, which have the above beneficial effects. Elaborations are omitted herein.

BRIEF DESCRIPTION OF THE DRAWINGS

In order to describe the technical solutions in embodiments of the present application or the prior art more clearly, the drawings required to be used in descriptions about the embodiments or the prior art will be introduced briefly below. Apparently, the drawings in the description below are only the embodiments of the present application. Those ordinarily skilled in the art may further obtain other drawings according to the provided drawings without creative work.

DETAILED DESCRIPTION

A core of the present application is to provide a method, system, and device for writing compressed data to a disk, and a readable storage medium, to reduce influence of writing compressed data to a disk on IO performance.

In order to make the objective, technical solutions, and advantages of the embodiments of the present application clearer, the technical solutions in the embodiments of the present application will be described clearly and completely below in combination with the drawings in the embodiments of the present application. Clearly, the described embodiments are not all but part of embodiments of the present application. All other embodiments obtained by those ordinarily skilled in the art based on the embodiments in the present application without creative work shall fall within the scope of protection of the present application.

Figure 1:
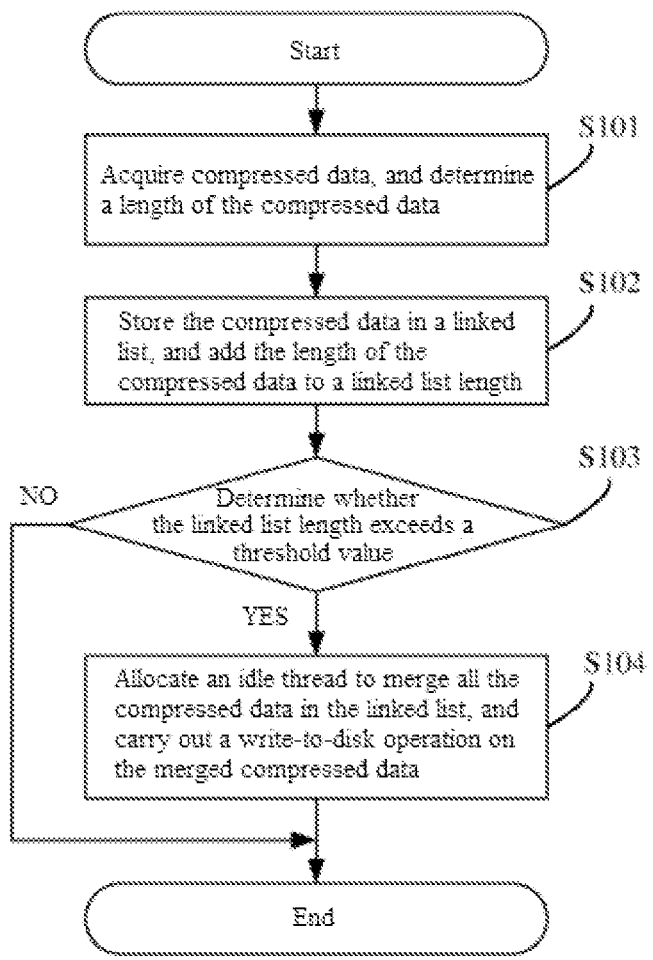
FIG. 1 is a flowchart of a method for writing compressed data to a disk according to an embodiment of the present application.

Referring to FIG. 1, FIG. 1 is a flowchart of a method for writing compressed data to a disk according to an embodiment of the present application.

The method specifically includes the following steps.

In S101, compressed data is acquired, and a length of the compressed data is determined.

In an existing data compression process, compressed data needs to be merged before a write-to-disk operation. This process involves copying of byte-level data in a memory, while the operation of merging the compressed data is embedded to an Input/Output (IO) path. As a result, the IO performance is affected. Based on this, the present application provides a method for writing compressed data to a disk, to solve the foregoing problem.

Optionally, the compressed data mentioned herein may be compressed data obtained by a compression card by compressing data, or compressed data obtained by a compression program by compressing data. A source of the compressed data is not specifically limited in the present application. The length of the compressed data mentioned herein is a data length after compression.

In S102, the compressed data is stored in a linked list, and the length of the compressed data is added to a linked list length.

The linked list length mentioned herein is a total length of all compressed data in the linked list. After the compressed data is stored in the linked list, the length of the compressed data is added to the linked list length, so as to ensure that the linked list length is the same as the total length of all the compressed data in the linked list. In the present application, the amount of the compressed data stored in the linked list may be determined based on the linked list length to further determine whether a write-to-disk operation is needed by the current compressed data.

In S103, whether the linked list length exceeds a threshold value is determined.

If YES, step S104 is performed.

The threshold value mentioned herein is a maximum allowable value of the total length of all the compressed data in the linked list. When the linked list length exceeds the threshold value, it indicates that there is so much compressed data in the linked list, and merging and write-to-disk operations are needed. In such case, step S104 is performed.

Optionally, when the linked list length does not exceed the threshold value, the step that compressed data is acquired and a length of the compressed data is determined may be performed. When the linked list length exceeds the threshold value, the compressed data in the linked list is merged and written to a disk.

In S104, an idle thread is allocated to merge all the compressed data in the linked list, and a write-to-disk operation is carried out on the merged compressed data.

Preferably, to enable the linked list to continue to store compressed data before next merging, after the step that an idle thread is allocated to merge all the compressed data in the linked list and a write-to-disk operation is carried out on the merged compressed data, the following step may further be performed:

all the compressed data is deleted from the linked list, and the linked list length is set to zero.

Preferably, to enable a user to timely carry out a further operation on the data written to the disk, after the step that an idle thread is allocated to merge all the compressed data in the linked list and a write-to-disk operation is carried out on the merged compressed data, the following step may further be performed:

prompting information that the write-to-disk operation for the compressed data is completed is output.

Based on the above technical solution, in the method for writing compressed data to a disk in the present application, the compressed data is stored in the linked list, the length of the compressed data is added to the linked list length, and when the linked list length exceeds the threshold value, the idle thread is allocated to merge all the compressed data in the linked list. A merging process of the compressed data is decoupled from an IO path, the compressed data does not need to be merged during an IO process of compression and write-to-disk, and instead, an idle thread is specially allocated to merge the compressed data. In this manner, influence on IO performance is avoided, CPU resources are fully utilized, and storage performance is improved.

Figure 2:
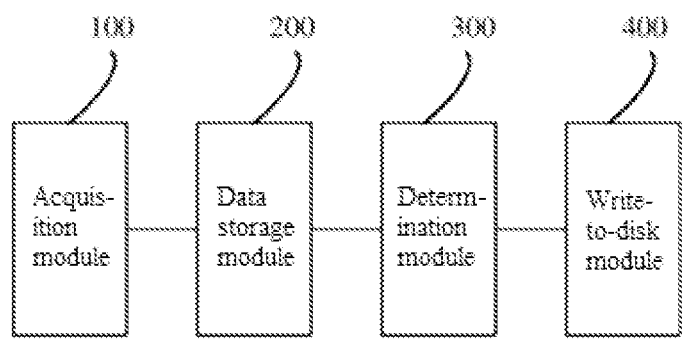
FIG. 2 is a structural diagram of a system for writing compressed data to a disk according to an embodiment of the present application.

Referring to FIG. 2, FIG. 2 is a structural diagram of a system for writing compressed data to a disk according to an embodiment of the present application.

The system may include:

an acquisition module 100, configured to acquire compressed data and determine a length of the compressed data;

a data storage module 200, configured to store the compressed data in a linked list and add the length of the compressed data to a linked list length, the linked list length is a total length of all compressed data in the linked list;

a determination module 300, configured to determine whether the linked list length exceeds a threshold value; and a write-to-disk module 400, configured to, when the linked list length exceeds the threshold value, allocate an idle thread to merge all the compressed data in the linked list, and carry out a write-to-disk operation on the merged compressed data.

Figure 3:
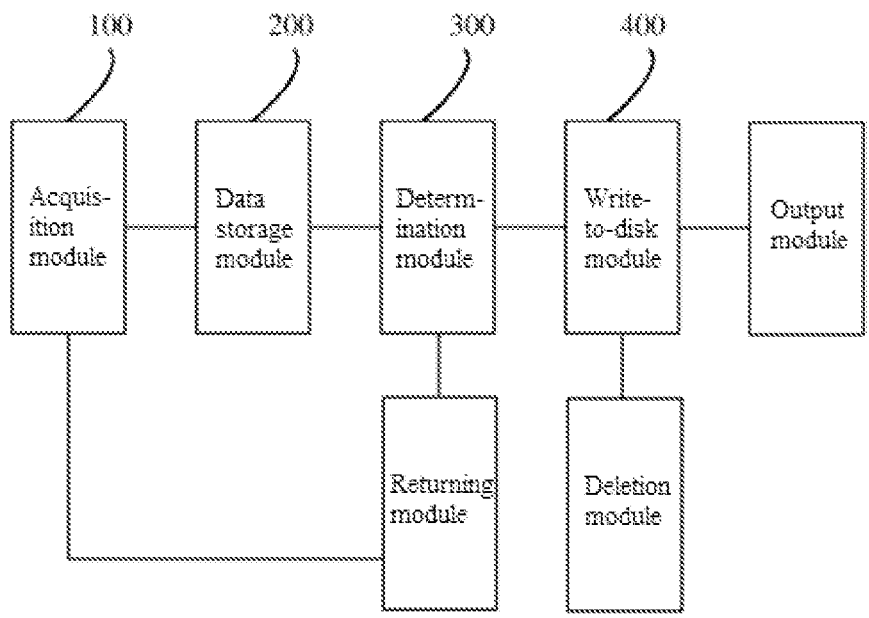
FIG. 3 is a structural diagram of another system for writing compressed data to a disk according to an embodiment of the present application.

Referring to FIG. 3, FIG. 3 is a structural diagram of another system for writing compressed data to a disk according to an embodiment of the present application.

The system may further include:

a deletion module, configured to, after the idle thread is allocated to merge all the compressed data in the linked list and the write-to-disk operation is carried out on the merged compressed data, delete all the compressed data from the linked list, and set the linked list length to zero.

The system may further include:

a returning module, configured to, when the linked list length does not exceed the threshold value, trigger the acquisition module to perform the step of acquiring compressed data and determining a length of the compressed data.

The system may further include:

an output module, configured to, after the idle thread is allocated to merge all the compressed data in the linked list and the write-to-disk operation is carried out on the merged compressed data, output prompting information that the write-to-disk operation for the compressed data is completed.

Each component in the above system may practically be applied to the following embodiment.

The acquisition module acquires compressed data, and determines a length of the compressed data. The data storage module stores the compressed data in a linked list, and adds the length of the compressed data to a linked list length. The determination module determines whether the linked list length exceeds a threshold value. When the linked list length does not exceed the threshold value, the acquisition module performs the step of acquiring compressed data and determining a length of the compressed data.

When the linked list length exceeds the threshold value, the write-to-disk module allocates an idle thread to merge all compressed data in the linked list, and carries out a write-to-disk operation on the merged compressed data. After the idle thread is allocated to merge all the compressed data in the linked list, and the write-to-disk operation is performed on the merged compressed data, the deletion module deletes all the compressed data from the linked list, and sets the linked list length to zero. The output module outputs prompting information that the write-to-disk operation for the compressed data is completed.

Figure 4:
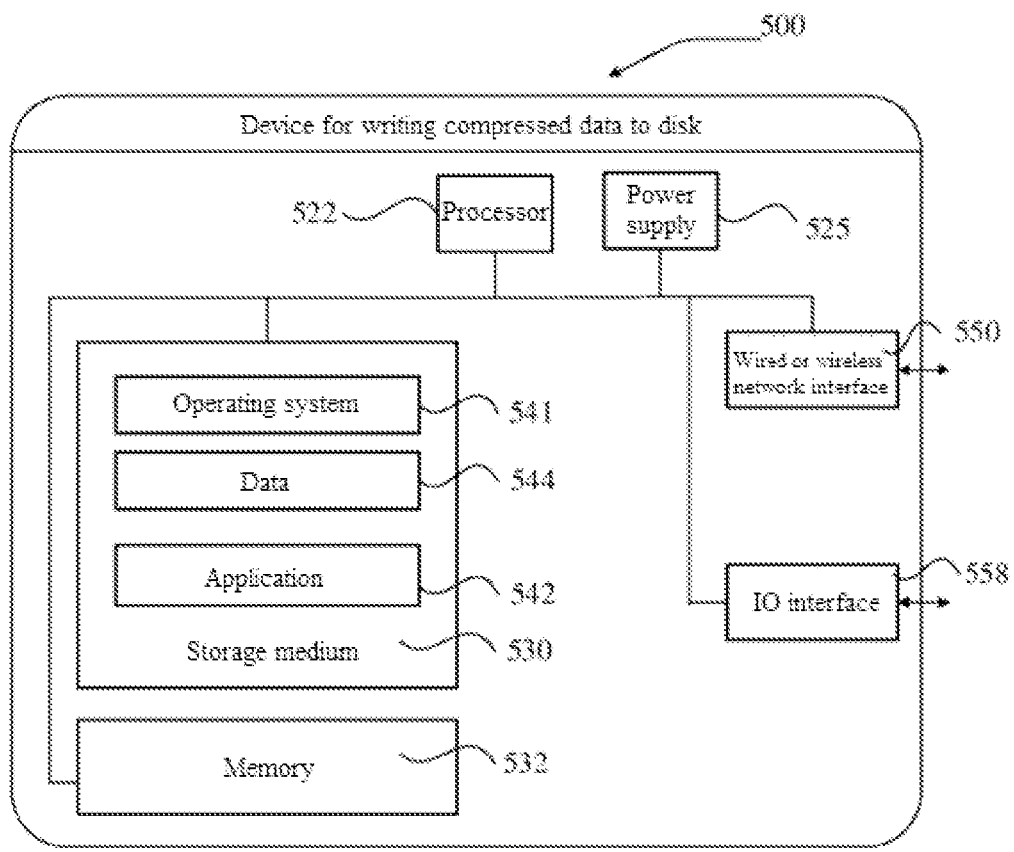
FIG. 4 is a structural diagram of a device for writing compressed data to a disk according to an embodiment of the present application.

Referring to FIG. 4, FIG. 4 is a structural diagram of a device for writing compressed data to a disk according to an embodiment of the present application.

The device 500 for writing compressed data to a disk may differ greatly in case of different configurations or performance. It may include one or more CPUs 522 (such as one or more processors), a memory 532, and one or more storage media 530 (such as one or more mass storage devices) storing applications 542 or data 544. The memory 532 and the storage medium 530 may implement temporary storage or persistent storage. The application stored in the storage medium 530 may include one or more modules (not shown in the figure), each of which may include a series of instruction operations on an apparatus. Furthermore, the processor 522 may be configured to communicate with the storage medium 530 to execute, on the device 500 for writing compressed data to a disk, the series of instruction operations in the storage medium 530.

The device 500 for writing compressed data to a disk may further include one or more power supplies 525, one or more wired or wireless network interfaces 550, one or more IO interfaces 558, and/or one or more operating systems 541, such as Windows Server™, Mac OS X™, Unix™, Linux™, and FreeBSD™.

The steps in the method for writing compressed data to a disk described in FIG. 1 are implemented by the device for writing compressed data to a disk based on the structure shown in FIG. 4.

Those skilled in the art may clearly know that, for ease and brevity of description, specific working processes of the system, apparatus, and module described above may refer to the corresponding processes in the method embodiment, and will not be elaborated herein.

In some embodiments provided in the present application, it is to be understood that the disclosed apparatus, device, and method may be implemented in other manners. For example, the apparatus embodiment described above is only schematic. For example, division of the modules is only logic function division, and other division manners may be used in practical implementation. For example, multiple modules or components may be combined or integrated into another system, or some characteristics may be neglected or not executed. In addition, coupling or direct coupling or communication connection between each displayed or discussed component may be indirect coupling or communication connection, implemented through some interfaces, of the apparatus or the modules, and may be electrical, mechanical, etc.

The modules described as separate parts may or may not be physically separated. Parts displayed as modules may or may not be physical modules, namely they may be located in the same place, or distributed to multiple network modules. Part or all of the modules may be selected as practically required to achieve the objective of the solution of the present embodiment.

In addition, each function module in each embodiment of the present application may be integrated into a processing module. Alternatively, each module may physically exist independently. Alternatively, two or more than two modules may be integrated into a module. The integrated module may be implemented in a hardware form, or in form of a software function module.

When being implemented in form of a software function module and sold or used as an independent product, the integrated module may be stored in a computer-readable storage medium. Based on such an understanding, the technical solutions of the present application substantially or parts making contributions to the prior art or all or part of the technical solutions may be embodied in form of a software product. The computer software product is stored in a storage medium, including a plurality of instructions for enabling a computer device (which may be a personal computer, a function calling apparatus, a network device, or the like) to execute all or part of the steps of the method in each embodiment of the present application. The storage medium includes various media capable of storing program codes, such as a U disk, a mobile hard disk, a Read-Only Memory (ROM), a Random Access Memory (RAM), a magnetic disk, or an optical disk.

The method, system, and device for writing compressed data to a disk, and readable storage medium provided in the present application are introduced above in detail. The principle and implementation modes of the present application are described herein with specific examples, and the descriptions about the above embodiments are only for helping understand the method and core idea of the present application. It is to be pointed out that those ordinarily skilled in the art may further make a plurality of improvements and embellishments to the present application without departing from the principle of the present application, and these improvements and embellishments shall also fall within the scope of protection of the claims of the present application.

It is also to be noted that relational terms in the specification, such as first and second, are used only to distinguish one entity or operation from another and do not necessarily require or imply the existence of any practical relation or sequence between these entities or operations. Moreover, terms "include" and "contain" or any other variation thereof is intended to cover nonexclusive inclusions, whereby a process, method, object, or device including a series of elements not only includes those elements but also includes other elements that are not clearly listed, or further includes elements intrinsic to the process, the method, the object, or the device. With no more restrictions, an element defined by statement "including a/an . . . " does not exclude the existence of the same other elements in a process, method, object, or device including the element.

What is claimed is:

1. A method for writing compressed data to a disk, comprising:
    acquiring compressed data and determining a length of the compressed data;
    storing the compressed data in a linked list, and adding the length of the compressed data to a linked list length, wherein the linked list length is a total length of all compressed data in the linked list;
    determining whether the linked list length exceeds a threshold value;
    in response to the linked list length exceeding the threshold value, allocating an idle thread to merge all the compressed data in the linked list, and carrying out a write-to-disk operation on the compressed data after merging all the compressed data in the linked list:
    deleting all the compressed data from the linked list, and setting the linked list length to zero; and
    outputting prompting information that the write-to-disk operation for the compressed data is completed.

2. The method according to claim 1, wherein in response to the linked list length not exceeding the threshold value, the method further comprises:
    performing the step of acquiring the compressed data and determining the length of the compressed data.

3. The method according to claim 1, wherein the compressed data is obtained by a compression card by compressing data.

4. The method according to claim 1, wherein the compressed data is obtained by a compression program by compressing data.

5. The method according to claim 1, wherein the length of the compressed data is a data length after compression.

6. A device for writing compressed data to a disk, comprising:
    a memory, configured to store a computer program; and
    a processor, configured to execute the computer program, and upon execution of the computer program, the processor is configured to:
    acquire compressed data and determine a length of the compressed data;
    store the compressed data in a linked list, and add the length of the compressed data to a linked list length, wherein the linked list length is a total length of all compressed data in the linked list;
    determine whether the linked list length exceeds a threshold value;
    in response to the linked list length exceeding the threshold value, allocate an idle thread to merge all the compressed data in the linked list, and carry out a write-to-disk operation on the compressed data after all the compressed data in the linked list is merged;
    delete all the compressed data from the linked list, and set the linked list length to zero; and
    output prompting information that the write-to-disk operation for the compressed data is completed.

7. The device for writing compressed data to a disk according to claim 6, wherein the processor, upon execution of the computer program, is further configured to:
    perform acquiring the compressed data and determine the length of the compressed data.

8. The device for writing compressed data to a disk according to claim 6, wherein the compressed data is obtained by a compression card by compressing data.

9. The device for writing compressed data to a disk according to claim 6, wherein the compressed data is obtained by a compression program by compressing data.

10. The device for writing compressed data to a disk according to claim 6, wherein the length of the compressed data is a data length after compression.

11. A non-transitory computer-readable storage medium, storing a computer program executable by a processor, and upon execution by the processor, the computer program is configured to cause the processor to:
    acquire compressed data and determine a length of the compressed data;
    store the compressed data in a linked list, and add the length of the compressed data to a linked list length, wherein the linked list length is a total length of all compressed data in the linked list;
    determine whether the linked list length exceeds a threshold value;
    in response to the linked list length exceeding the threshold value, allocate an idle thread to merge all the compressed data in the linked list, and carry out a write-to-disk operation on the compressed data after all the compressed data in the linked list is merged;

delete all the compressed data from the linked list, and set the linked list length to zero; and output prompting information that the write-to-disk operation for the compressed data is completed.

12. The non-transitory computer-readable storage medium according to claim 11, wherein the computer program, upon execution by the processor, is further configured to cause the processor to:

perform acquiring the compressed data and determine the length of the compressed data.

13. The non-transitory computer-readable storage medium according to claim 11, wherein the compressed data is obtained by a compression card by compressing data.

14. The non-transitory computer-readable storage medium according to claim 11, wherein the compressed data is obtained by a compression program by compressing data.

* * * * *